(12) United States Patent
Noguchi et al.

(10) Patent No.: US 6,500,872 B1
(45) Date of Patent: Dec. 31, 2002

(54) METHOD FOR RECYCLING WASTE STYRENE RESIN

(75) Inventors: Tsutomu Noguchi, Kanagawa (JP); Mayumi Miyashita, Kanagawa (JP); Miyuki Kamei, Kanagawa (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 09/583,276

(22) Filed: May 31, 2000

(30) Foreign Application Priority Data

May 31, 1999 (JP) .......................................... 11-152931

(51) Int. Cl.[7] ............................................... C08J 11/04
(52) U.S. Cl. ........................... 521/47; 521/40; 210/767; 210/774; 528/48
(58) Field of Search ........................................... 521/47

(56) References Cited

U.S. PATENT DOCUMENTS

| | | | | |
|---|---|---|---|---|
| 5,269,948 A | * | 12/1993 | Krutchen | 521/47 |
| 5,300,267 A | * | 4/1994 | Moore | 521/47 |
| 5,630,945 A | * | 5/1997 | Takayanagi et al. | 210/773 |
| 5,824,709 A | * | 10/1998 | Suka | 521/47 |
| 6,169,121 B1 | * | 1/2001 | Noguchi et al. | 521/47 |

FOREIGN PATENT DOCUMENTS

| | | |
|---|---|---|
| JP | 10 219024 A | 8/1998 |
| WO | WO 94/24194 A | 10/1994 |

* cited by examiner

*Primary Examiner*—Margaret Medley
(74) *Attorney, Agent, or Firm*—Sonnenschein, Nath & Rosenthal (57) ABSTRACT

A recycling method which enables recycling of a high-quality regenerated styrene resin. A waste styrene resin material is dissolved in an organic solvent boiling at a temperature lower than 200° C. and having solubility not less than 15 wt % at room temperature to prepare a solution of the waste styrene resin material. The resulting solution is freed of volatile components on heating in vacuum to remove the organic solvent to set the amount of the residual solvent in the styrene resin to 0.4 wt % or less to recycle the resulting styrene resin as a regenerated styrene resin.

16 Claims, 5 Drawing Sheets

METHOD FOR RECYCLING WASTE STYRENE RESIN

RELATED APPLICATION DATA

The present application claims priority to Japanese Application No. P11-152931 filed May 31, 1999, which application is incorporated herein by reference to the extent permitted by law.

BACKGROUND OF THE INVENTION

1. Field of the Invention

This invention relates to a method for recycling a high-quality regenerated styrene resin from a waste styrene resin, such as expanded styrene or styrene cabinets, or waste styrene resin doped with a combustion-retardant agent, such as expanded styrene or styrene cabinets doped with a combustion-retardant agent.

2. Description of Related Art

The styrene resins, doped or not doped with a combustion-retardant agent, is used extensively as a cabinet material for a variety of electric equipment or as a building material. In addition, expanded styrene is used in large quantities as a variety of packaging materials.

Recently, attempts have been made to recover and re-use the waste materials, for environmental maintenance and economic merits. For example, a proposal has been made for dissolving the waste styrene material, such as expanded styrene or styrene cabinets, in an organic solvent for reducing the volume of the waste material, the resulting solution is transported to a recycling plant where it is heated in vacuum to remove volatile components to remove the organic solvent to recycle the residual product as regenerated styrene.

The above-described recycling system suffers a problem that the solvent which has dissolved the expanded styrene or styrene cabinets in the regenerated styrene be left over in the regenerated styrene. If the organic solvent is left over in the regenerated styrene, its heat resistance or tensile strength is appreciably lowered to degrade the quality of the regenerated styrene. In particular, ester-based solvents are high boiling such that the solvent is liable to be left over even on heating in vacuum for removing volatile components. If the heating temperature is raised to lower the amount of the residual solvent, the styrene resin tends to be thermally decomposed to lower the strength of the styrene material.

Moreover, a heating step is included in the recycling process, such that, if the recycling process is carried out in vacuum, oxidation is produced under the effect of residual oxygen, such that the molecular weight of the regenerated styrene resin is decreased. If the molecular weight is decreased, the regenerated materia is lowered in tensile strength and impact strength, thus appreciably lowering its quality.

On the other hand, expanded styrene doped with a combustion-retardant agent, used as a building material, or expanded styrene doped with a combustion-retardant agent, used as a cabinet for a television receiver, contains a halogen-based combustion-retardant agent in an amount approximately 1 to 10 wt %. If the styrene resin containing the combustion-retardant agent is heated to a temperature of 200° C. or higher, the combustion-retardant agent is thermally decomposed to yield an acid which leads to significantly lowered strength of the styrene resin and hence to significantly lowered quality of the regenerated styrene. On the other hand, the processing equipment is attacked by acids yielded on thermal decomposition of the combustion-retardant agent. Thus, no effective recycling method has so far been established, such that the major portions of the waste styrene resin doped with the combustion-retardant agent are used as a land-filling material or a starting material for high-furnaces or incinerated for disposal. As the combustion-retardant agent, halogen-based combustion-retardant agents are used as a rule, so that dioxins are feared to be produced in the course of incineration for disposal.

SUMMARY OF THE INVENTION

It is therefore an object of the present invention to provide a method for disposal for effectively decreasing the amount of residual solvents in the regenerated styrene resin and for preventing oxidation of the styrene resin in the course of the recycling, and therewith a recycling method which allows for recycling of the high-quality regenerated styrene resin.

It is another object of the present invention to provide a method for disposal for effectively decreasing the residual amount of the combustion-retardant agent in the regenerated styrene resin and therewith a recycling method which allows for recycling of the high-quality regenerated styrene resin.

In one aspect, the present invention provides a method for recycling a waste styrene resin material including dissolving the waste styrene resin material in an organic solvent boiling at a temperature lower than 200° C. and having solubility not less than 15 wt % at room temperature to prepare a solution of the waste styrene resin material, removing impurities from the solution of the waste styrene resin material; and vacuum heating the solution of the waste styrene resin material freed of the impurities to remove volatile components and the organic solvent to reduce the amount of the residual solvent in the styrene resin to not larger than 0.4 wt % to recycle the resulting styrene resin as a regenerated styrene resin.

According to the present invention, since the waste styrene resin material is dissolved in an organic solvent boiling at a temperature lower than 200° C. and having solubility not less than 15 wt % at room temperature, the amount of the organic solvent used is diminished to improve the operating efficiency. By setting the amount of the residual solvent in the styrene resin to 4 wt % or less, characteristics of the material of the regenerated styrene resin, such as the thermal resistance or tensile strength, may be maintained at optimum values.

In another aspect, the present invention provides a method for recycling a waste styrene resin material doped with a combustion-retardant agent including dissolving the waste styrene resin material doped with the combustion-retardant agent in an organic solvent boiling at a temperature lower than 200° C. and having solubility not less than 15 wt % at room temperature to prepare a solution of the waste styrene resin material, removing the combustion-retardant agent from the solution of the waste styrene resin material to give an amount of the residual combustion-retardant agent in the styrene resin to not larger than 1% and vacuum heating the solution of the waste styrene resin material freed of the combustion-retardant agent to remove the volatile components and the organic solvent to reduce the amount of the residual solvent in the styrene resin to not larger than 0.4 wt % to recycle the resulting styrene resin as a regenerated styrene resin.

According to the present invention, since the waste styrene resin material doped with the combustion-retardant agent is dissolved in an organic solvent boiling at a temperature lower than 200° C. and having solubility not less than 15 wt % at room temperature, the amount of the organic solvent used is diminished to improve the operating efficiency. By setting the amount of the residual solvent in the styrene resin to 4 wt % or less, characteristics of the material of the regenerated styrene resin, such as the thermal resistance or tensile strength, may be maintained at optimum values. Moreover, by setting the amount of the residual solvent in the styrene resin to 4 wt % or less, the amount of the acid yielded on thermal decomposition of the combustion-retardant agent may be diminished to affect the strength of the material of the regenerated styrene resin only to a lesser extent to evade attacking the processing equipment.

According to the present invention, as described above, in which the waste styrene resin material is dissolved in an organic solvent boiling at a temperature lower than 200° C. and having solubility not less than 15 wt % at room temperature, the amount of the organic solvent used may be diminished to improve the operating efficiency. By setting the amount of the residual solvent in the styrene resin, characteristics of the material of the regenerated styrene resin, such as thermal resistance or tensile strength, may be maintained at optimum values. This renders it possible to recycle the high-quality regenerated styrene resin.

Moreover, according to the present invention, as described above, in which the waste styrene resin material doped with the combustion-retardant agent is dissolved in an organic solvent boiling at a temperature lower than 200° C. and having solubility not less than 15 wt % at room temperature, the amount of the organic solvent used may be diminished to improve the operating efficiency. By setting the amount of the residual solvent in the styrene resin to not higher than 0.4 wt %, characteristics of the material of the regenerated styrene resin, such as thermal resistance or tensile strength, may be maintained at optimum values. Moreover, by setting the amount of the residual combustion-retardant agent to not larger than 1%, the amount of the acid yielded on thermal decomposition of the combustion-retardant agent may be diminished to eliminate adverse effects of the regenerated styrene resin on the strength of the resin material or on the processing equipment.

Thus, the added value of the regenerated styrene resin doped or not doped with the combustion-retardant agent and the application may be raised to reduce the waste material to save natural resources and energy.

DESCRIPTION OF THE PREFERRED EMBODIMENTS

Referring to the drawings, preferred embodiments of according to the present invention will be explained in detail.

First, the recycling method for waste styrene resin is explained.

The present invention resides in that a waste material of styrene resin, such as expanded styrene or styrene cabinets, is dissolved in an organic solvent for decreasing the volume of the waste material, the resulting solution is transported to a recycling plant and heated in vacuum to remove volatile components and the organic solvent to recycle the residual produce as regenerated styrene, in which the power of dissolution and the boiling point of the organic solvent as well as the residual solvent in the regenerated styrene are prescribed to recycle the regenerated styrene of high quality.

The articles processed according to the present invention are waste materials of styrene resins in general, irrespective of the configuration or properties thereof, such as packaging materials of expanded styrene, fish boxes of expanded styrene, a variety of styrene cabinets.

These styrene resin waste materials are first dissolved in an organic solvent. The organic solvent used is such an organic solvent which has a power of dissolution of not less than 15 wt % at ambient temperature and a boiling point of 200° C. or lower.

If, as the organic solvent dissolving the waste styrene resin, an organic solvent having the power of dissolution of not less than 15 wt % at ambient temperature is used, it is possible to decrease the amount of the organic solvent used, while it is also possible to improve the working efficiency in the vacuum heating process aimed at removing volatile components.

If, as the organic solvent dissolving the waste styrene resin, an organic solvent, an organic solvent boiling at 200° C. or lower is used, it is possible to improve the operating efficiency in the vacuum heating process aimed at removing volatile components, while it is possible to decrease the amount of the residual solvent in the styrene resin reliably.

Examples of usable organic solvents include ketone-based and mono-terpene based organic solvents. For environmental protection, halogen-free organic solvents, such as toluene, d-limonene, ethyl benzene, tetrahydrofuran, methylethylketone and monoterpene-based solvents. Of these, d-limonene is an organic solvent favorable for this usage. This d-limonene is a vegetable oil extracted from the rind of oranges and is used as a food additive. It is high in safety factor and dissolving power for the expanded styrene such that it is optimum as a solvent used in the present invention.

The residual solvent in the styrene resin appreciably lowers characteristics of the material, such as thermal resistance or tensile strength of the regenerated styrene resin to lower its tensile strength and hence the quality of the material significantly. The recycled styrene resin is worked into regenerated styrene pellets with a diameter and a length each of the order of 3 mm. The residual solvent in the regenerated styrene pellets are left unchanged in a product manufactured from the pellets. If the residual solvent is present in large quantities in the regenerated styrene pellets, the material of a product obtained using the pellet is lowered in properties to lower the product quality. It is therefore crucial to set the amount of the residual solvent in the styrene resin. Specifically, the amount of the residual solvent in the styrene resin is desirably 0.4 wt % or less. If the amount of the residual solvent in the styrene resin is not less than 0.4 wt %, the properties of the material of the regenerated styrene resin, such as resistance to heating or tensile strength, are appreciably lowered to deteriorate the product quality. Thus, by setting the amount of the residual solvent in the styrene resin to 0.4 wt % or less, it is possible to recycle high-quality regenerated styrene having good characteristics.

The recycling process for the styrene resin includes a hot-working step, such that, even if recycling is repeated in vacuum, the styrene resin is oxidized under the effect of residual oxygen to lower the molecular weight of the regenerated styrene resin. If the molecular weight is decreased, the tensile strength or the impact strength is lowered to give rise to the appreciably lowered product quality. It is therefore desirable to add an anti-oxidant to a styrene resin solution, before proceeding to the hot-working step, in order to prevent oxidation of the regenerated styrene resin. The reason is that, when heat is applied to the styrene resin during the hot-working step, the styrene resin is oxidized to prevent the molecular weight from being decreased.

As anti-oxidants, phosphorus-based, phenolic and sulfuric oxides are extensively used. If a vacuum heating step is executed, it is desirable to use anti-oxidants having a low vapor pressure. Specifically, hindered phenolic anti-oxidants are preferentially used. Preferably, 0.01 to 0.5 wt % of the hindered phenolic anti-oxidants is added based on the weight of the waste material of the styrene resin. Also, the hindered phenolic anti-oxidants are preferably of a vapor pressure at 20° C. equal to $10^{-7}$ Pa or less. This renders it possible to prevent the styrene resin from being oxidized, that is to prevent the molecular weight of the styrene resin from being decreased, even if the hot-working step is used. If the hindered phenolic anti-oxidants are added in an amount of 0.01 to 0.5 wt %, the thermal resistance of the styrene resin is not lowered, such that its desirable properties are maintained to render it possible to recycle the high-quality styrene resin.

In addition, the anti-oxidants having a low vapor pressure, among the hindered phenolic anti-oxidants, are especially high in its effect in prohibiting oxidation of the styrene resin, such that, by using those anti-oxidants, the number of times of recycling can be increased further.

The heating temperature used in executing vacuum heating for removal of volatile components is preferably less than 260° C. If the heating temperature is not less than 260° C., the styrene resin is thermally decomposed to appreciably lower the characteristics of the material of the regenerated styrene resin, such as thermal resistance or tensile strength, as well as to significantly decrease the molecular weight of the regenerated styrene resin to lower the product quality significantly. If the heating temperature used in executing the vacuum heating for removing volatile components is set to 260° C. or less, it is possible to maintain optimum characteristics of the material of the styrene resin to recycle the high-quality styrene resin.

Figure 1:
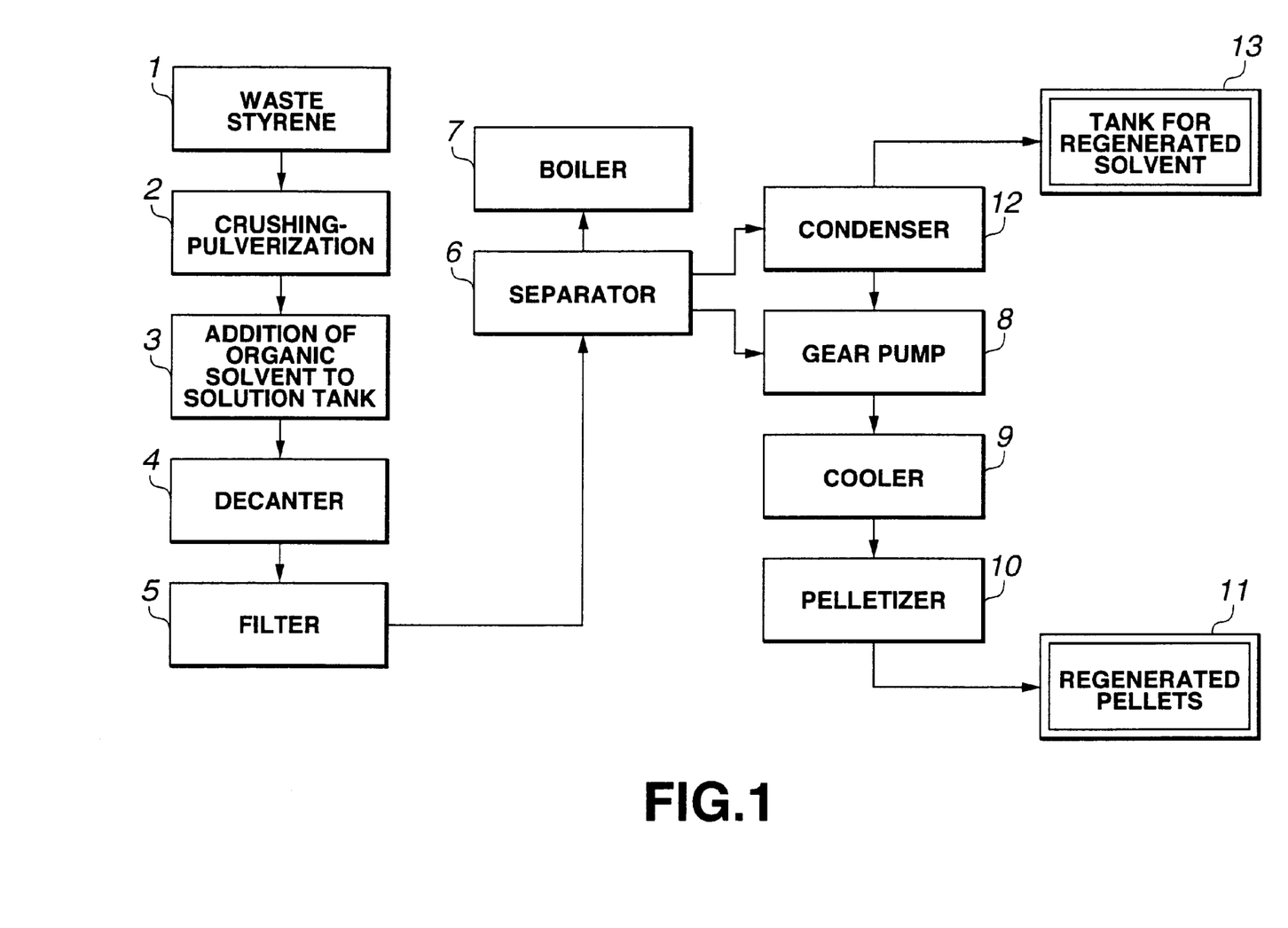
FIG. 1 is a flow diagram showing an illustrative recycling method for waste styrene resin according to the present invention.

FIG. 1 shows the processing flow in recycling the waste styrene resin material.

In this recycling system, a waste styrene resin material 1 is crushed and pulverized at 2 and dissolved in an organic solvent in a dissolution tank 3 to provide a homogeneous composition.

This homogenized solution is continuously freed of a combustion-retardant agent, as a non-soluble component, in a decanter 4, as the solution is heated to a temperature of the order of 60° C. The clarified solution is sent to a filtration unit 5 where it is filtered and subsequently separated into a styrene resin and the solvent in a separator 6.

This separator 6 is heated to approximately 240° C. by e.g., the heat medium of the boiler 7.

This separated styrene resin is cooled by a cooler 9, on actuating a gear pump 8, and processed by a pelletizer 10 to produce regenerated pellets 11 which then are transported to a molding plant for re-utilization as a variety of molded products or polystyrene vessels.

On the other hand, the vapor of a solvent separated by the separator 6 is liquefied by a condenser 12 and recovered as a regenerated solvent (regenerated limonene) in a tank for the regenerated solvent 13.

The method for recycling the waste styrene resin material doped with a combustion-retardant agent is hereinafter explained.

The present invention resides in a recycling system for styrene in which a waste material of styrene resin, such as expanded styrene doped with a combustion-retardant agent or styrene cabinets doped with a combustion-retardant agent, is dissolved in an organic solvent for reducing the volume of the waste material and freed of the combustion-retardant agent, with the resulting solution being transported to a recycling plant for heating in vacuum for removing volatile components and recovering the organic solvent, with the resulting product being recycled as regenerated styrene. According to the present invention, the power of dissolution and the boiling point are prescribed to recycle the high-quality regenerated styrene.

The object of processing is the waste styrene resin material doped with the combustion-retardant agent as a whole, such as, for example, expanded styrene packaging material, doped with a combustion-retardant agent, an expanded styrene fish box, the material of which is doped with a combustion-retardant agent, or a variety of styrene cabinets, the material of which is doped with a combustion-retardant agent, irrespective of the material configuration or shape.

In the method for recycling the waste styrene resin material doped with a combustion-retardant agent, the matter explained in connection with the recycling method of the waste styrene resin material is valid in its entirety. Therefore, insofar as this matter is concerned, the corresponding explanation is not made and reference is to be had to the relevant explanation. Here, the matter other than the matter explained above is explained.

The waste styrene resin material, doped with the combustion-retardant agent, is dissolved in an organic solvent. At this time, the waste styrene resin material, doped with the combustion-retardant agent, is preferably pulverized to a size of the order of 1 mm. By such pulverization, it is possible to elevate the speed of dissolution in the organic solvent.

The solution obtained on dissolving the waste styrene resin material doped with the combustion-retardant agent in the organic solvent is freed of non-soluble components of the combustion-retardant agent, using decantation and filtration.

If, in recycling the waste styrene resin material doped with the combustion-retardant agent, the styrene resin containing a few wt % of the combustion-retardant agent is heated to 200° C. or higher, the combustion-retardant agent is thermally decomposed to yield an acid. The result is that characteristics of the material of the regenerated styrene resin, such as thermal resistance or tensile strength, are appreciably lowered to deteriorate the properties of the material significantly. On the other hand, the processing equipment is attacked with acid yielded on thermal decomposition of the combustion-retardant agent. Therefore, in recycling the waste styrene resin material doped with the combustion-retardant agent, it is crucial to decrease the amount of the combustion-retardant agent contained in the styrene resin prior to carrying out the heating process. The amount of the residual combustion-retardant agent in the styrene resin is preferably not larger than 1 wt %. If the amount of the residual combustion-retardant agent in the styrene resin is larger than 1 wt %, the characteristics of the material of the regenerated styrene resin, such as thermal resistance or tensile strength, are appreciably lowered to deteriorate the properties of the material significantly, while the processing equipment is attacked by acid as described above. If the amount of the residual combustion-retardant agent in the styrene resin is set so as to be not larger than 1 wt %, it is possible to maintain desirable characteristics of the material of the regenerated styrene resin to prevent corrosion of the processing equipment. Since the rate of yielding of the acid becomes the higher the higher the heating temperature, the heating temperature used for vacuum heating for removing volatile components is preferably less than 260° C. taking also the deterioration of the styrene resin into consideration. By setting the heating temperature so as to be less than 260° C., it is possible to suppress the yielding of the acid to prevent adverse effect of the regenerated styrene resin on the characteristics of the material and the processing equipment.

The processing for removing the combustion-retardant agent prior to the heating process, specifically, the vacuum heating for removing volatile components and for separating an organic solvent and the styrene resin from each other, can be performed using the decantation. Using the decantation, it is possible to remove the waste styrene resin material doped with the combustion-retardant agent present as a non-soluble component in the solution on dissolving the waste styrene resin material doped with the combustion-retardant agent in the organic solvent. By judiciously selecting the combination of the combustion-retardant agent and the organic solvent dissolving the waste styrene resin material doped with the combustion-retardant agent, the amount of the residual combustion-retardant agent in the styrene resin following combustion-retardant agent removal can be decreased. That is, by selectively using such an organic solvent which is superior in the power of dissolution with respect to the styrene resin and which is low in the power of dissolution with respect to the combustion-retardant agent, the amount of the combustion-retardant agent present as a non-soluble component in the solution can be increased, thus increasing the amount of the combustion-retardant agent removed at the time of the processing for removing the combustion-retardant agent using the decantation to diminish the amount of the residual combustion-retardant agent in the styrene resin. The processing for removing the combustion-retardant agent can also be performed using a centrifugal separator. By judiciously selecting the combination of the organic solvent for dissolving the waste styrene resin material doped with the combustion-retardant agent, as in the case of the decantation, it is possible to reduce the amount of the residual combustion-retardant agent in the styrene resin following the processing of removing the combustion-retardant agent.

The combustion-retardant agent can also be removed by precipitating the styrene resin by mixing a lower alcohol in the solution in which is dissolved the waste styrene resin material doped with the combustion-retardant agent. Since the styrene resin is dissolved in this case as a non-soluble component, it can be separated from the combustion-retardant agent dissolved in the solution. It is possible in this manner to separate the styrene resin and the combustion-retardant agent effectively from each other to diminish the amount of the residual combustion-retardant agent in the styrene resin. The lower alcohol preferably has a boiling point not lower than 200° C. If the boiling point of the lower alcohol used is higher than 200° C., the operation efficiency in the vacuum heating for removing the non-volatile components is lowered or the alcohol is liable to be left in the regenerated styrene resin. Also, the lower alcohol preferably has the number of carbon atoms not less than two in view of its effect on the human body and inflammability. If the solubility differential between the combustion-retardant agent and the styrene resin is taken into account, the number of carbon atoms in the lower alcohol of 2 to 5 is preferred. Specifically, the lower alcohol may be enumerated by ethanol, propanol, butanol and pentanol.

The combustion-retardant agent may also be removed first by decantation or centrifugation followed by mixing of the lower alcohol into the solution for precipitation of the styrene resin. This enables the styrene resin and the combustion-retardant agent to be removed more reliably from each other to lower the amount of the residual combustion-retardant agent in the regenerated styrene resin.

Figure 2:
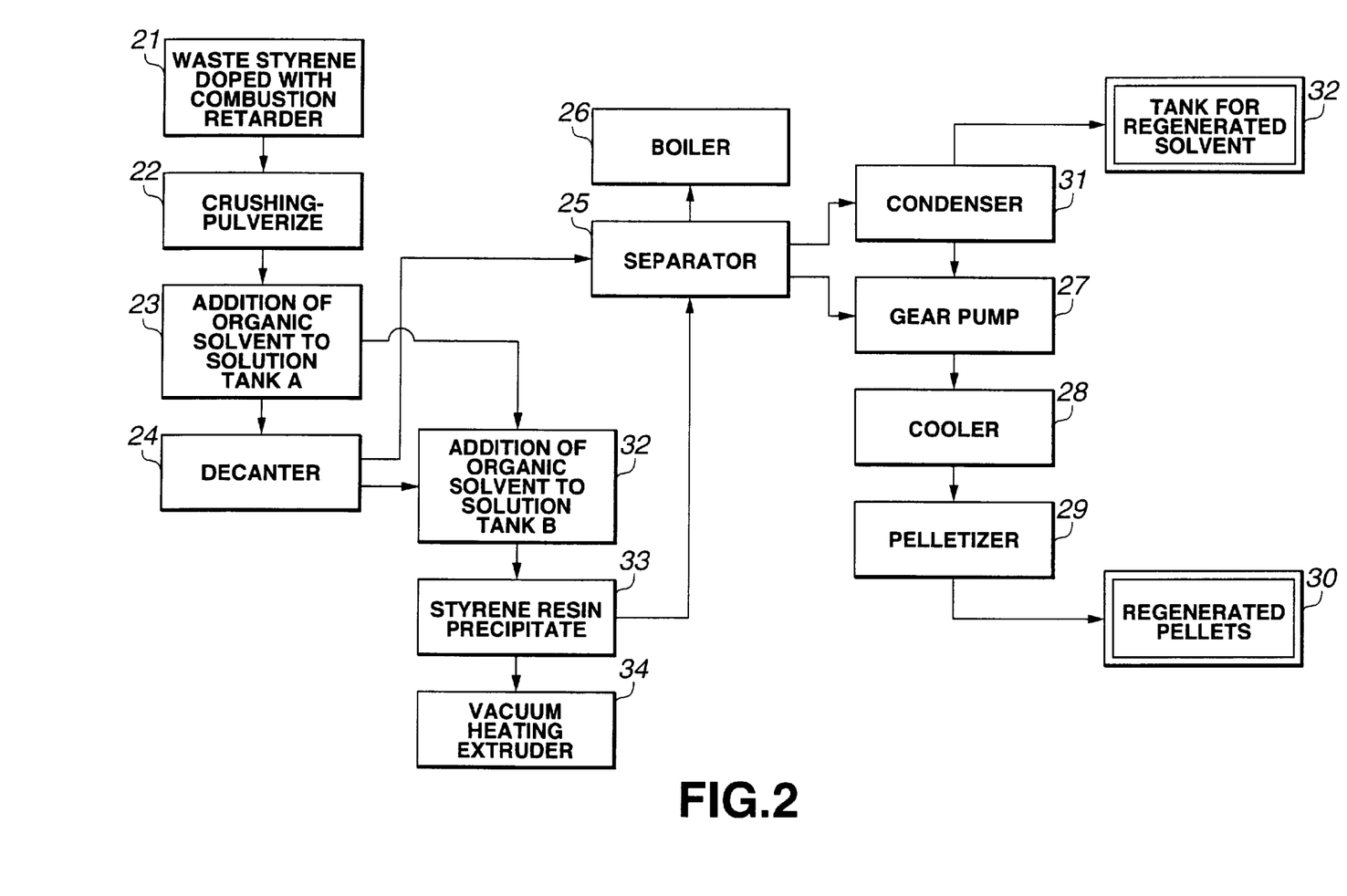
FIG. 2 a flow diagram showing an illustrative recycling method for waste styrene resin doped with a combustion-retardant agent according to the present invention.

FIG. 2 shows an illustrative flow diagram for recycling the waste styrene resin material doped with the combustion-retardant agent.

In this recycling system, the waste styrene resin material doped with the combustion-retardant agent 21 is crushed and pulverized at 22 and dissolved in a dissolution tank A23 in the organic solvent to give a homogeneous composition.

This homogeneous composition, heated to a temperature of approximately 60° C., is continuously freed of the combustion-retardant agent as a non-soluble component, in a decanter 24. The clarified solution is separated in the separator 25 into the styrene resin and the solvent.

This separator 25 is heated to approximately 240° C. by a heat medium, such a boiler 26.

The separated styrene resin is cooled through a cooler 28 by the driving of a gear pump 27 and processed by a pelletizer 29 to form regenerated pellets 30 which then are transported to a molding plant to produce various molded products and polystyrene vessels for re-use.

The vapor of the solvent taken out by the separator 25 is liquefied by a condenser 31 which then is recovered as a regenerated solvent (regenerated limonene) in a tank for regenerated limonene 32.

The homogeneous solution, obtained on dissolution in the organic solvent in the solution tank A 23, may be transferred to a solution tank B for mixing into a lower alcohol. In this case, styrene resin precipitates 33 are generated as a non-soluble component for separation into the styrene resin and the solvent.

The separated styrene resin precipitates 33 are fed to a separator 25 and recycled by a process similar to that described above The separated styrene resin precipitates 33 may also sent to a vacuum heating extruder 34 for extrusion into a yam-like product which may then be sent to a cooler 28.

The solution clarified by the decanter 24 may also be sent into a solution tank B for recycling by a process similar to one described above.

EXAMPLES

The present invention will be explained, with reference to specified experimental examples, based on the experimental results.

First, experimental examples 1 to 7 show experimental examples of the methods for recycling the waste styrene resin material.

Experimental Example 1

A variety of organic solvents were checked as to solubility of styrene resins therein. 15 wt % of the waste expanded styrene packaging material for TV, recovered from a household electrical equipment store, was dissolved in each of toluene, boiling at 101° C., methylethylketone, boiling at 80° C., ethyl benzene, boiling at 136° C., tetrahydrofuran, boiling at 65° C., d-limonene, boiling at 175° C., and dipentene, boiling at 170 to 180° C., each in an amount of 15 wt %, at room temperature (20° C.).

As a result, it was found that these organic solvents showed good solubility, and that, in particular, toluene, ethyl benzene, d-limonene and dipentene showed the dissolution capability not lower than 30 wt %.

Next, a solution obtained on dissolving 30 wt % of expanded styrene in toluene and d-limonene, was freed of volatile components in a recycling experimental plant, having a vacuum heating device aimed at removing volatile components, manufactured by MITSUI ZOSEN CO. LTD. under the trade name of HI-VISCUS EVAPORATOR, to prepare regenerated styrene pellets.

The vacuum heating for removing volatile components was carried out under the following conditions:
Vacuum Heating Conditions for Removing Volatile Components
gas phase temperature in a vacuum chamber: 240° C.
heat medium temperature: 250° C.
degree of vacuum: 30 Torr
supply flow of the solution: 50 liters/min.

As a result, the amount of the residual solvent in the regenerated styrene pellets in each case was not larger than 0.1 wt %. The rate of decrease of the molecular weight of the regenerated styrene pellets in each case was not larger than 5%. As mechanical properties of the regenerated styrene pellets, prepared using d-limonene as the organic solvent, the tensile strength, impact strength and the softening point were measured. The results are shown in Table 1:

TABLE 1

|  | after recycling | new resin |
|---|---|---|
| tensile strength (kg/cm$^2$) | 473 | 479 |
| bending strength (kg/cm$^2$) | 710 | 720 |
| impact strength (kgfm/cm) | 0.8 | 0.7 |
| softening point (° C.) | 103.4 | 103.5 |

It is seen from Table 1 that the tensile strength, bending strength and the softening point of the regenerated styrene pellets are equivalent to those of the new styrene resin, such that the regenerated styrene pellets are not deteriorated in quality.

Experimental Example 2

Changes in thermal resistance of regenerated styrene pellets due to the residual solvent were checked.

A 30 wt % solution of expanded styrene in d-limonene was prepared to prepare regenerated styrene pellets in the same way as in the Experimental Example 1. In this case, the degree of vacuum in the vacuum chamber was changed to change the amount of the residual solvent in the regenerated styrene pellets in a range of from 0.0 to 1.1% to prepare seven samples of the regenerated styrene pellets to check into thermal resistance of each sample.

The thermal resistance was evaluated by measuring the glass transition temperature Tg as an index of the thermal resistance.

Figure 3:
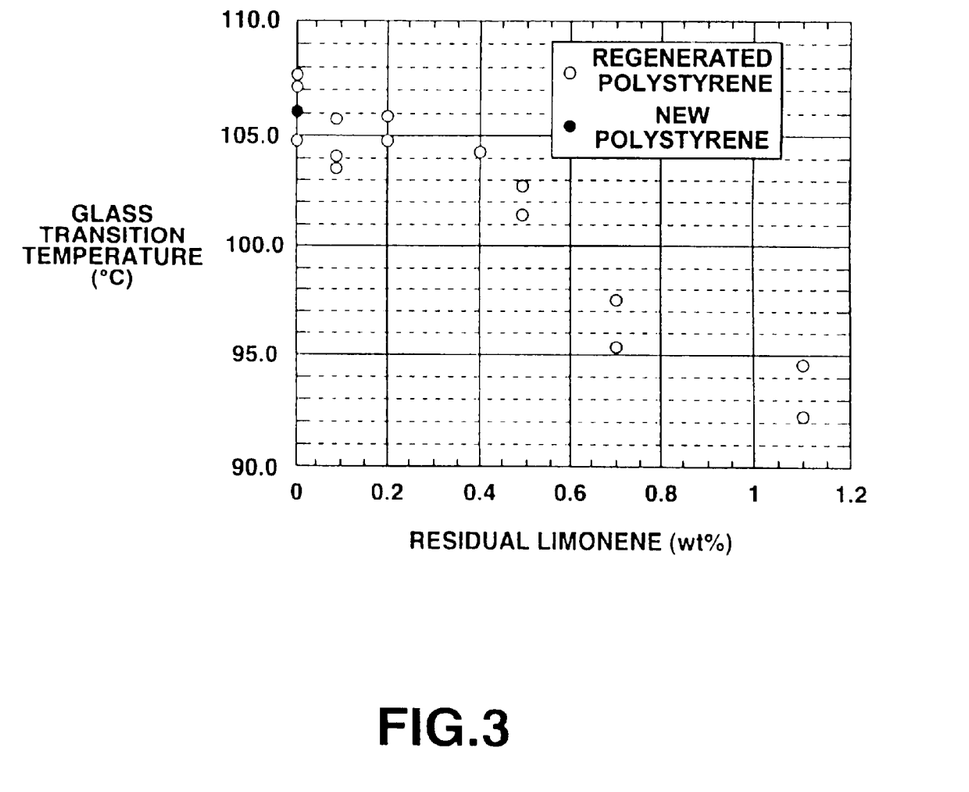
FIG. 3 is a graph showing the relationship between the residual limonene quantity in the regenerated styrene resin and the glass transition temperature.

The results are shown in FIG. 3. It is noted that the glass transition temperature Tg has been measured twice or thrice per sample.

It is seen from FIG. 3 that, if the amount of the residual solvent in the regenerated styrene pellets exceeds 0.4%, the glass transition temperature Tg is lowered appreciably, that is that, if the amount of the residual solvent in the regenerated styrene pellets exceeds 0.4%, the thermal resistance of the regenerated styrene pellets is lowered significantly. It may thus be seen that, by setting the amount of the residual solvent in the regenerated styrene pellets so as to be not larger than 0.4%, it is possible to recycle the regenerated styrene pellets having a superior thermal resistance.

Experimental Example 3

The thermal resistance of the styrene pellets by the amount of the residual solvent in the regenerated styrene pellets was checked as in the experimental example 2.

A 30 wt % solution in d-limonene of high-impact polystyrene, used in a TV cabinet, was prepared to prepare regenerated styrene pellets as in the experimental example 1. At this time, the degree of vacuum in the vacuum chamber was changed to change the amount of the residual solvent in the regenerated styrene pellets in a range from 0.045 to 0.6% to fabricate five samples of the regenerated styrene pellets to check the thermal resistance of the respective samples.

The thermal resistance was checked by measuring the glass transition temperature Tg as in the experimental example 2. The results are shown in FIG. 4.

Figure 4:
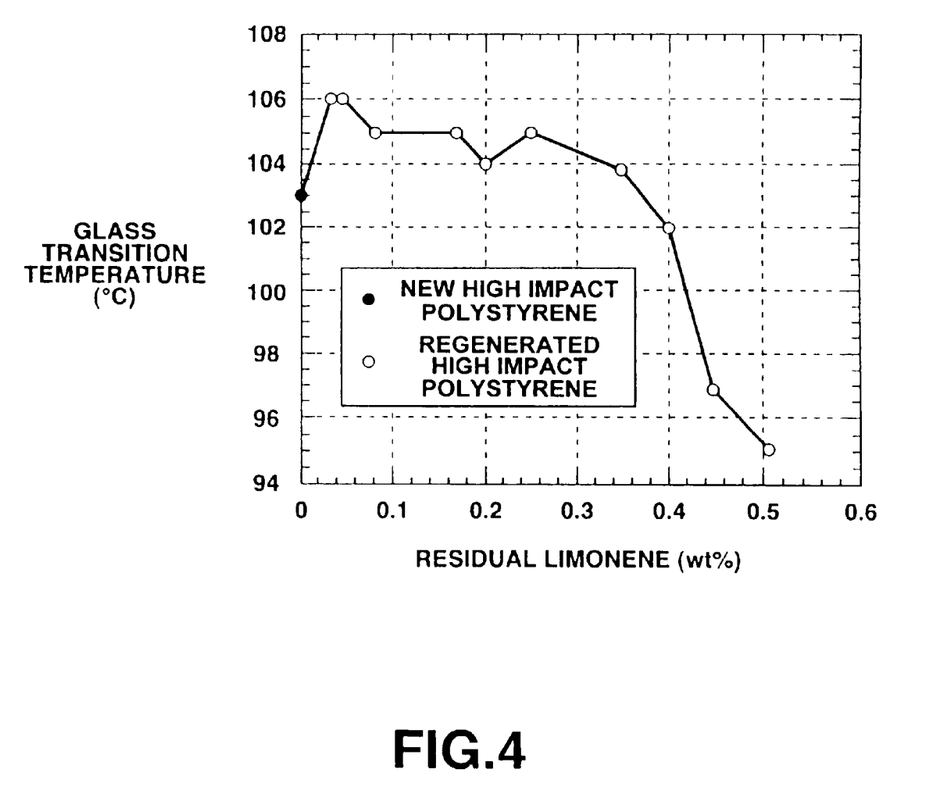
FIG. 4 is similarly a graph showing the relationship between the residual limonene quantity in the regenerated styrene resin and the glass transition temperature.

It is seen from FIG. 4 that, if the amount of the residual solvent in the regenerated styrene pellets exceeds 0.4%, the glass transition temperature Tg is lowered appreciably. It may be seen from this that, by setting the residual solvent amount in the regenerated styrene pellets to not larger than 0.4%, it is possible to recycle the regenerated styrene pellets having superior thermal resistance.

Experimental Example 4

The effect of the hindered phenolic anti-oxidants was checked.

A 30 wt % solution in d-limonene of polystyrene, manufactured by ASAHI KASEI CO. LTD. under the trade name of PS685 was prepared and the hindered phenolic anti-oxidants were added in amounts of 0.1, 0.2 and 0.5 wt % based on the weight of polystyrene to respective solutions. The resulting solutions were heated at 230° C. for one hour in air to prepare respective samples. The following five sorts of the hindered phenolic anti-oxidants:

IRGANOX 245 (manufactured by Ciba Speciality Chemicals, vapor pressure, $10^{-8}$ Pa)

IRGANOX 1010 (manufactured by Ciba Speciality Chemicals, vapor pressure, $10^{-10}$ Pa)

IRGANOX 1076 (manufactured by Ciba Speciality Chemicals, vapor pressure, $10^{-7}$ Pa)

IRGANOX 1330 (manufactured by Ciba Speciality Chemicals, vapor pressure, $10^{-12}$ Pa)

IRGANOX 3114 (manufactured by Ciba Speciality Chemicals, vapor pressure, $10^{-13}$ Pa) were used.

The molecular weights of the respective samples, prepared as described above, were measured by gel permeation chromatography, abbreviated below to GPC, the results are shown in Table 2.

TABLE 2

| appellation and amount of addition | heating conditions | anti-oxidants appellation | vapor pressure | molecular weight | rate of decrease in molecular weight |
|---|---|---|---|---|---|
| only PS685 | no heating | — | | 24.5E + 04 | — |
| only PS685 | 230° C.-1 hr | — | | 4.8E + 04 | 80% |
| 0.10% | 230° C.-1 hr | IRGANOX 245 | $10^{-8}$ Pa | 7.4E + 04 | 70% |
| 0.10% | 230° C.-1 hr | 1010 | $10^{-10}$ Pa | 7.8E + 04 | 68% |
| 0.10% | 230° C.-1 hr | 1076 | $10^{-7}$ Pa | 13.9E + 04 | 43% |
| 0.10% | 230° C.-1 hr | 1330 | $10^{-12}$ Pa | 16.9E + 04 | 31% |
| 0.10% | 230° C.-1 hr | 3114 | $10^{-13}$ Pa | 16.3E + 04 | 33% |
| 0.20% | 230° C.-1 hr | IRGANOX 245 | $10^{-8}$ Pa | 15.0E + 04 | 39% |
| 0.20% | 230° C.-1 hr | 1010 | $10^{-10}$ Pa | 14.0E + 04 | 43% |
| 0.20% | 230° C.-1 hr | 1076 | $10^{-7}$ Pa | 19.5E + 04 | 20% |
| 0.20% | 230° C.-1 hr | 1330 | $10^{-12}$ Pa | 23.6E + 04 | 4% |
| 0.20% | 230° C.-1 hr | 3114 | $10^{-13}$ Pa | 18.9E + 04 | 23% |
| 0.50% | 230° C.-1 hr | IRGANOX 245 | $10^{-8}$ Pa | 20.1E + 04 | 18% |
| 0.50% | 230° C.-1 hr | 1010 | $10^{-10}$ Pa | 21.4E + 04 | 13% |
| 0.50% | 230° C.-1 hr | 1076 | $10^{-7}$ Pa | 18.2E + 04 | 26% |
| 0.50% | 230° C.-1 hr | 1330 | $10^{-12}$ Pa | 23.1E + 04 | 6% |
| 0.50% | 230° C.-1 hr | 3114 | $10^{-13}$ Pa | 20.8E + 04 | 15% |

It is seen from Table 2 that the sample heated without adding the hindered phenolic anti-oxidants is decreased in the polystyrene molecular weight by 80% after heating. On the other hand, with the sample added to with 0.1 wt % of hindered phenolic anti-oxidants, the rate of decrease of the polystyrene molecular weight is suppressed to 30 to 70%. With the samples added to with 0.1 wt %, 0.2 wt % and with 0.5 wt % of hindered phenolic anti-oxidants, the rate of decrease of the polystyrene molecular weight is suppressed to 30 to 70%, 4 to 43 wt % and to 6 to 26%, respectively. It has also been seen that IRGANOX 1330 and IRGANOX 3114, having the vapor pressure not higher than $10^{-12}$ Pa, exhibit high effect in preventing the polystyrene molecular weight from being decreased. It has also been seen from this that, by adding the hindered phenolic anti-oxidants in an amount not larger than 0.5 wt % based on the weight of polystyrene, the polystyrene molecular weight can be prevented from being decreased, that is that polystyrene can be prevented from being oxidized.

Measurement of the glass transition temperature of the above samples gave similar results to those of new polystyrene. It is seen from this that addition of the hindered phenolic anti-oxidants up to 0.5 wt % based on the polystyrene weight does not lead to the lowered thermal resistance of polystyrene.

Then, ten times of recycling operations were performed in a similar manner to Example 1 except that polystyrene manufactured by ASAHI KASEI CO. LTD. under the trade name of PS685 and d-limonene were used as the polystyrene resin and as the organic solvent, respectively, and that 0.1 wt % of the hindered phenolic anti-oxidants IRGANOX 1330 was added to a polystyrene solution in d-limonene based on the weight of polystyrene in each recycling operation. It was found that the rate of decrease of polystyrene was not higher than 10%. It may be seen from this that, by using the hindered phenolic anti-oxidants IRGANOX 1330 with the low vapor pressure, the number of times of recycling can be increased further to render possible more effective utilization of resources.

Experimental Example 5

Polystyrene recycling was carried out as in Experimental Example 5 except using polystyrene manufactured by ASAHI KASEI CO. LTD. under the trade name of PS685, using toluene (aromatic organic solvent), methylethylketone (ketonic organic solvent), tetrahydrofuran (etheric solvent), pinene and dipentene (terpene-based organic solvent) and a mixture of these solvents and using hindered phenolic anti-oxidants IRGANOX 1330. The rates of decrease of the polystyrene molecular weight after ten times of recycling were not higher than 20%. It may be seen from this that, if polystyrene recycling is performed using the above organic solvents, it is possible to prevent the molecular weight of polystyrene after the recycling from being decreased, by addition of the hindered phenolic anti-oxidant IRGANOX1330, as compared to the case of not adding the anti-oxidant.

Experimental Example 6

Each 20 wt % solution of a waste expanded styrene material, recovered from a household electrical equipment store, at room temperature (20° C.), in DBE ester boiling at 210 to 225° C., dimethyl succinate, boiling at 200° C. and in dimethyl adipate, boiling at approximately 230° C., was prepared, and regenerated styrene pellets were prepared in the same way as in the Experimental Example 1.

As a result, in any of the solutions, employing the above-mentioned organic solvents, 0.6 to 1 wt % of the residual solvent was left in the regenerated styrene pellets, whilst the glass transition temperature Tg was lowered by approximately 30° C.

For further decreasing the residual solvent quantity, the heating temperature for vacuum heating for removing volatile components was raised to 260° C. for removing volatile components. As a result, the amount of the residual solvent in the regenerated styrene pellets was not decreased to below 0.4 wt %. If the heating temperature of the vacuum heating for removing volatile components is raised to 260° C., the regenerated styrene pellets undergo thermal decomposition so that the molecular weight is decreased by 10%, with the color of the pellets being changed to yellow.

Thus, it has been found that, for maintaining characteristics of the regenerated styrene pellets, the heating temperature of the vacuum heating for removing volatile components needs to be lower than 260° C., whilst the organic solvent boiling at lower than 200° C. needs to be selectively used.

Experimental Example 6

Samples of regenerated styrene pellets were prepared in the same way as in the Experimental Example 1, except that polystyrene manufactured by ASAHI KASEI CO. LTD. under the trade name of PS685 and d-limonene were used as the polystyrene resin and as the organic solvent, respectively, to prepare a polystyrene solution, and that a phosphorus-based anti-oxidant and a sulfur-based anti-oxidant, each having a vapor pressure exceeding $10^{-6}$Pa, were added to the polystyrene solution in amounts of 0.1, 0.2 and 0.5 wt %, based on the polystyrene weight. The following three sorts of the phosphorus-based anti-oxidant and the sulfur-based anti-oxidant:

IRGANOX 1425 (manufactured by Ciba Speciality Chemicals, phosphorus-based, vapor pressure, $10^{-2}$ Pa)

IRGANOFOS 168 (manufactured by Ciba Speciality Chemicals, phosphorus-based, vapor pressure, $10^{-2}$ Pa)

IRGANOXPS 1010 (manufactured by Ciba Speciality Chemicals, sulfur-based, vapor pressure, $10^{-6}$ Pa) were used.

The molecular weights of respective samples, manufactured as described above, were measured by GPC. As a result, the rate of decrease of the molecular weight of polystyrene was 30 to 60%, irrespective of the sorts of the anti-oxidants used. It was found from this that, with the phosphorus-based anti-oxidant and the sulfur-based anti-oxidant, with the vapor pressure not less than $10^{-6}$ Pa, anti-oxidative effects could hardly be acquired in carrying out the vacuum heating process.

In the following experimental examples 8 to 15, an experimental example of the recycling methods of the waste styrene resin material doped with the combustion-retardant agent are shown.

Experimental Example 8

The solubilities of the styrene resin with combustion-retardant agent in a variety of organic solvents were checked. 30 wt % each of a waste styrene resin material doped with the combustion-retardant agent, as a waste TV cabinet material containing 10 wt % of deca bromo diphenyl ether (bromine-based combustion-retardant agent), was dissolved at room temperature (20° C.) in toluene boiling at 101° C., methylethylketone, boiling at 80° C., ethyl benzene, boiling at 136° C., tetrahydrofuran, boiling at 65° C., d-limonene, boiling at 175° C. and in dipentene, boiling at 170 to 180° C. As a result, it was found that the organic solvents unexceptionally exhibited good solubility not less than 20 wt % and that especially toluene, d-limonene and dipentene exhibited good solubility.

The recycling of the waste styrene resin material doped with the combustion-retardant agent then was carried out.

First, the waste styrene resin material doped with the combustion-retardant agent, which is the waste TV cabinet material containing 10 wt % of decabromo diphenyl ether (bromine-based combustion-retardant agent), was crushed to a size of approximately 1cm. For further improving the rate of dissolution into the organic solvent, the crushed waste material was pulverized using a mesh mill manufactured by HORAI CO.LTD.

The pulverized waste styrene resin material doped with the combustion-retardant agent was dissolved, using a dissolution tank fitted with a stirrer and a temperature adjustment unit, manufactured by MITSUBISHI KAKOKI CO. LTD., so that the amount of the waste styrene resin material will be 30 wt % based on the weight of toluene, d-limonene and dipentene.

The resulting solution at 60° C. was freed of bromine-based combustion-retardant agent, as a non-soluble component, by centrifugation, using a decanter centrifuge, with a separator plate, manufactured by MITSUBISHI KAKO CO. LTD. under a trade name of DZ20, having a centrifugal force of 3500 G.

The solution freed of the combustion-retardant agent was then passed through a back filter with a pore diameter of approximately 100 μm and freed of volatile components on a recycling test plant manufactured by MITSUI ZOSEN CO. LTD. under the trade name of HI-VISCUS EVAPORATOR, to prepare regenerated styrene pellets. The vacuum heating for removing volatile components was carried out under the following conditions:

Vacuum Heating Conditions for Removing Volatile Components gas phase temperature in a vacuum chamber: 240° C.

heat medium temperature: 250° C.

degree of vacuum: 30 Torr supply flow of the solution: 50 liters/min.

Figure 5:
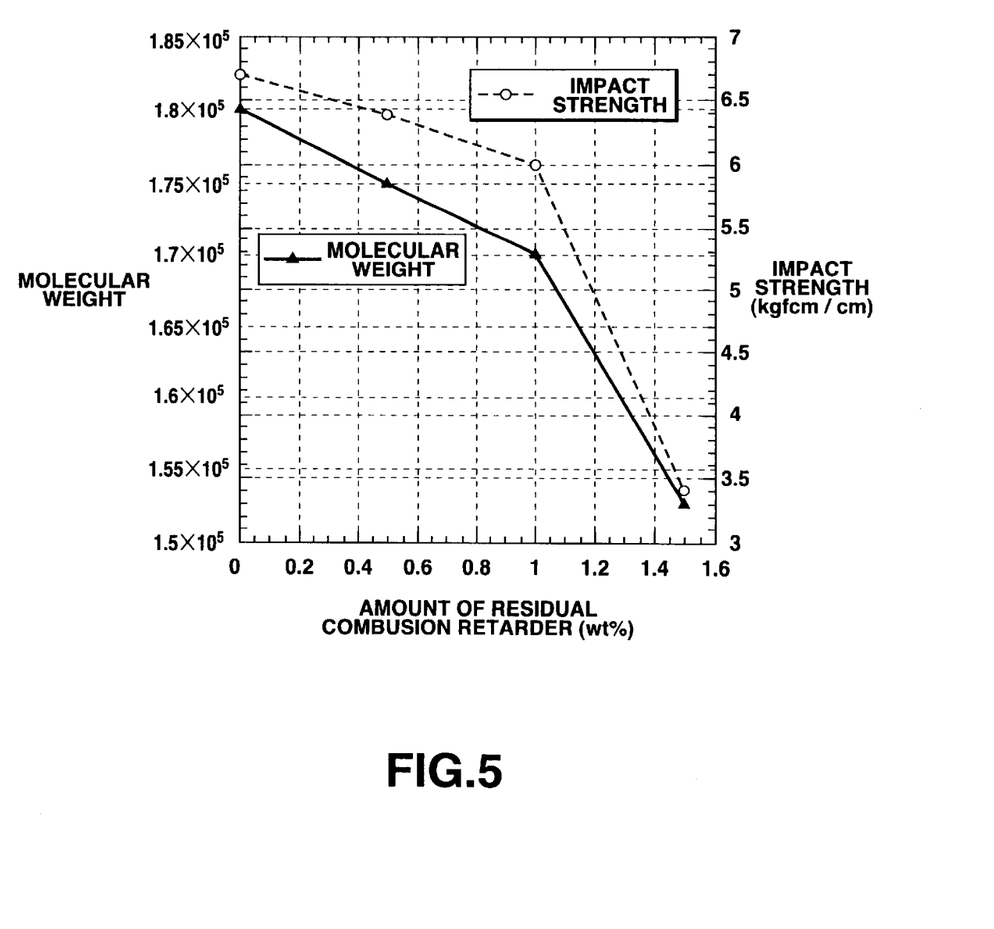
FIG. 5 is a graph showing the relationship between the amount of the residual combustion-retardant agent, molecular weight and the impact strength.

As a result, the amount of the residual solvent in the regenerated styrene pellets in each case was not larger than 0.1 wt %. The amounts of the residual solvent in the regenerated styrene pellets were 1.5 wt %, 1 wt % and 1 wt % in the cases of toluene, d-limonene and dipentene, respectively. The rate of decrease of the molecular weight were less than 15%, 10% and 10%, respectively. Measurements were made of the tensile strength, bending strength, impact strength and the softening point of the regenerated styrene pellets, as mechanical properties. It was found that these properties were equivalent to those of the new material, except that the impact strength was lowered by approximately 10% as compared to that of the new material, such that the regenerated styrene pellets were not lowered in the quality. FIG. 5 shows the relationship between the amount of the combustion-retardant agent in the regenerated styrene pellets, molecular weight and the impact strength for the case of using d-limonene. It may be seen from FIG. 5 that, if the amount of the combustion-retardant agent in the regenerated styrene pellets is less than 1 wt %, the rate of decrease of the molecular weight is less than 10%, with the rate of decrease of the impact strength being less than 10%. However, if the amount of the residual combustion-retardant agent exceeds 1 wt % to reach 1.5 wt %, the rate of decrease of the impact strength is increased. This is presumably ascribable to the fact that the decomposition of rubber components due to halogen components contained mainly in the combustion-retardant agent becomes significant. It has thus been seen that, if it is desired to maintain good characteristics of the material of the regenerated styrene resin, the amount of the residual combustion-retardant agent in the regenerated styrene pellets needs to be suppressed to within 1 wt %.

Experimental Example 9

Changes in the thermal resistance of the regenerated styrene pellets with the amount of the residual solvent were checked.

A 30 wt % solution in d-limonene of the waste styrene resin material doped with the combustion-retardant agent, as used in the experimental example 8, was prepared to fabricate regenerated styrene pellets in the same way as in the experimental example 8. At this time, the degree of vacuum in the vacuum chamber was varied to adjust the residual solvent quantity in the regenerated styrene pellets to 0.045 wt %, 0.1 wt %, 0.15 wt %, 0.35 wt %, 0.4 wt %, 0.45 wt %, 0.5 wt % and to 0.6 wt %, to fabricate eight sorts of the regenerated styrene pellets and thermal resistance thereof were checked.

The thermal resistance was evaluated by measuring the glass transition temperature Tg as an index of the thermal resistance.

It was found that, with the amounts of the residual solvent in the regenerated styrene pellets of 0.045, 0.1, 0.15, 0.35 and 0.4 wt %, the glass transition temperature equivalent to that of the new material was displayed, such that the thermal resistance of the regenerated styrene pellets was maintained in an optimum state. Conversely, the glass transition temperature of the regenerated styrene pellets for the amount of the residual solvent in the regenerated styrene pellets of 0.6 wt % is decreased by approximately 10° C., such that the thermal resistance of the regenerated styrene pellets was lowered. It may be seen form this that, in order to maintain optimum thermal resistance, the amount of the residual solvent in the regenerated styrene pellets needs to be set to 0.4 wt % or less.

Experimental Example 10

A waste styrene resin material doped with the combustion-retardant agent, which is the waste TV cabinet material containing 10 wt % of decabromo diphenyl ether (bromine-based combustion-retardant agent), was crushed to a size of approximately 1 cm. For further improving the rate of dissolution into the organic solvent, the crushed waste material was pulverized using a mesh mill manufactured by HORAI CO.LTD.

The pulverized waste styrene resin material doped with the combustion-retardant agent was dissolved, using a dissolution tank fitted with a stirrer and a temperature adjustment unit, manufactured by MITSUBISHI KAKOKI CO. LTD., so that the amount of the waste styrene resin material will be 20 wt % based on the weight of d-limonene, to prepare a solution.

This solution at 60° C. was continuously freed of bromine-based combustion-retardant agent, as a non-soluble component, by centrifugation, using a decanter centrifuge, with a separator plate, manufactured by MITSUBISHI KAKO CO. LTD. under a trade name of DZ20, having a centrifugal force of 3500 G. The solution, thus centrifuged, was dried. It was found that the amount of the residual combustion-retardant agent in the as-dried styrene resin with the combustion-retardant agent was approximately 1wt %.

The solution freed of the bromine-based combustion-retardant agent was charged into four dissolution tanks and 30 vol % of ethanol, isopropyl alcohol, butanol and pentanol, based on the weight of the solution, was mixed in the solution to precipitate the styrene resin component. The gelated styrene resin precipitates were freed of volatile components on a recycling test plant manufactured by MITSUI ZOSEN CO. LTD. under the trade name of HI-VISCUS EVAPORATOR, to prepare regenerated styrene pellets. The vacuum heating for removing volatile components was carried out under the following conditions:
Vacuum Heating Conditions for Removing Volatile Components
gas phase temperature in a vacuum chamber: 240° C.
heat medium temperature: 250° C.
degree of vacuum: 30 Torr
amount of supply of precipitates: 50 liters per hour.

As a result, it was found that the rate of removal of the combustion-retardant agent varied with the types of the lower alcohols mixed into the system, such that, if the lower alcohols mixed were ethanol and isopropyl alcohol, the removal rate was 80%, whereas, if the lower alcohols mixed were butanol and pentanol, the removal rate was 90%. The amount of the residual combustion-retardant agent in the regenerated styrene pellets could be reduced to 0.1 to 0.2 wt % in either cases. The yield of the styrene resin was 60%. By this, the effect of removing the combustion-retardant agent by mixing the lower alcohol could be ascertained. In particular, butanol and pentanol were found to be high in the effect in removing the combustion-retardant agent.

The amount of the residual solvent in the regenerated styrene pellets was not larger than 0.1 wt % in either cases. Measurements were made of the tensile strength, bending strength and the softening point, as mechanical properties. It was found that these properties compare favourably with those of the new resin. Thus, it was confirmed that the regenerated styrene resin having characteristics of the material compare with those of the new material could be recycled even in cases wherein the lower alcohols are mixed into the solution obtained on dissolving the styrene resin in an organic solvent to remove the combustion-retardant agent.

Experimental Example 11

A rice-cake-like precipitate of the styrene resin obtained in the Experimental Example 10 was freed of volatile components in a recycling experimental plant having a uniaxial screw extruder capable of vacuum heating to prepare regenerated styrene pellets. The vacuum heating for removing volatile components was carried out under the following conditions:
Vacuum Heating for Removing Volatile Components
heat medium temperature: 250° C.
degree of vacuum: 30 Torr
amount of supply of precipitates: 50 kg per hour.

As a result, the amount of the residual solvent in the regenerated styrene pellets was not larger than 0.4 wt % for any sample. The rate of decrease of the molecular weight of the regenerated styrene pellets was not larger than 5% for any samples. Measurements were made of the tensile strength, bending strength and the softening point as mechanical properties. It was found that, for any samples, the mechanical properties compare favourably with those of the new materials thus indicating that optimum characteristics were maintained. It may be seen from this that, if the precipitated styrene resin is solidified in a rice cake fashion by addition of the lower alcohols, for removing volatile components of the organic solvent and extrusion of the styrene resin are possible by a screw extruder that can be heated in vacuum, even if the vacuum heating for removing volatile components unit or the gear pump is not used.

Experimental Example 12

A 15 wt % solution in d-limonene of a waste styrene resin material doped with the combustion-retardant agent, containing 10 wt % of decabromo diphenyl ether (bromine-based combustion-retardant agent), was prepared.

The solution then was continuously freed of the bromine-based combustion-retardant agent, as a non-soluble component, at room temperature, using a centrifuging machine manufactured by KUBOTA CO. LTD., a micro-mini centrifuging machine with a centrifugal force of 10000 G. The centrifuged solution was dried to give a residual amount of the combustion-retardant agent in the as-dried styrene resin material doped with the combustion-retardant agent was approximately 1 wt %.

The solution freed of the bromine-based combustion-retardant agent was charged into three dissolution tanks and 50 vol % of isopropyl alcohol, butanol and pentanol, based on the volume of the solution, to precipitate the styrene resin component. The gelated styrene resin precipitates were freed of volatile components on a vacuum heating for removing volatile components unit manufactured by MITSUI ZOSEN CO. LTD. under the trade name of HI-VISCUS EVAPORATOR, to prepare regenerated styrene pellets. The vacuum heating for removing volatile components was carried out under the following conditions:
Vacuum Heating for Removing Volatile Components Conditions
gas phase temperature in a vacuum chamber: 240° C.
heat medium temperature: 250° C.
degree of vacuum: 30 Torr
amount of supply of precipitates: 50 liters per hour.

As a result, it was found that the rate of removal of the combustion-retardant agent varied with the types of the lower alcohols mixed into the system, such that, if the lower alcohol mixed was isopropyl alcohol, the removal rate was 80%, whereas, if the lower alcohols mixed were butanol and pentanol, the removal rate was 70%. The amount of the residual combustion-retardant agent in the regenerated styrene pellets could be reduced to 0.3 wt % in either cases. The yield of the styrene resin was increased to 95%. By this, the effect of removing the combustion-retardant agent by adding the lower alcohol could be ascertained. In particular, butanol and pentanol were found to be high in its effect in removing the combustion-retardant agent.

The amount of the residual solvent in the regenerated styrene pellets was not larger than 0.1 wt % in either cases. Measurements were made of the tensile strength, bending strength and the softening point, as mechanical properties. It was found that these properties compare favourably with those of the new resin. Thus, it was confirmed that the regenerated styrene resin having characteristics of the material compare favourably with those of the new material could be recycled even in cases wherein the lower alcohols are mixed into a solution obtained on dissolving the styrene resin in an organic solvent to remove the combustion-retardant agent.

Experimental Example 13

A waste expanded styrene resin material with a combustion-retardant agent for w building materials, containing 2 wt % of hexabromo cyclododecane (bromine-based combustion-retardant agent), was charged into a uniaxial extruder, heated to approximately 220° C., to form regenerated styrene pellets. As a result, the styrene resin was decomposed due to oxidation by oxygen on heating and also due to decomposition products of the bromine-based combustion-retardant agent. Thus, the molecular weight of regenerated styrene pellets was decreased by approximately 40%, whilst the glass transition temperature was lowered to approximately 10° C. to lower the molecular weight of regenerated styrene pellets. As for the mechanical properties, the tensile strength was lowered by 20%, while the impact strength was decreased by approximately 30%. It was found from this that heating needs to be carried out in vacuum and that, if the expanded waste styrene resin material with a combustion-retardant agent is to be recycled, it is necessary to remove the combustion-retardant agent.

Experimental Example 14

A waste styrene resin material doped with the combustion-retardant agent, which is the waste TV cabinet material containing 10 wt % of decabromo diphenyl ether (bromine-based combustion-retardant agent), was crushed to a size of approximately 1 cm. For further improving the rate of dissolution into the organic solvent, the crushed waste material was pulverized using a mesh mill manufactured by HORAI CO.LTD.

The pulverized waste styrene resin material doped with the combustion-retardant agent was dissolved, using a dissolution tank fitted with a stirrer and a temperature adjustment unit, manufactured by MITSUBISHI KAKOKI CO. LTD., so that the amount of the waste styrene resin material will be 20 wt % based on the weight of DBE ester boiling at 210 to 225° C., to prepare a solution.

Regenerated styrene pellets were produced in the same way as in the Experimental Example 8 except not removing the combustion-retardant agent.

As a result, the amount of the residual solvent in the regenerated styrene pellets was not larger than 0.6 wt %, whilst the glass transition temperature was lowered by approximately 30° C.

For lowering the quantity of the residual solvent, the heating temperature for vacuum heating for removing volatile components e\was elevated to 260° C. to effect for removing volatile components. As a result, the amount of the residual solvent in the regenerated styrene pellets was not lower than 0.4 wt %. If the heating temperature of the vacuum heating for removing volatile components is raised to 260° C., the regenerated styrene pellets undergo thermal decomposition, while the styrene resin is deteriorated significantly, so that the molecular weight is decreased by 30%, with the color of the pellets being changed to deep yellow. Thus, it has been found that, for maintaining characteristics of the regenerated styrene pellets, the heating temperature of the vacuum heating for removing volatile components needs to be lower than 260° C., whilst the organic solvent boiling at lower than 200° C. needs to be selectively used and the combustion-retardant agent needs to be removed if it is desired to recycle the styrene resin doped with the combustion-retardant agent.

Experimental Example 15

An expanded waste styrene resin material doped with the combustion-retardant agent, for a building material, containing 5 wt % of decabromo diphenyl ether (bromine-based combustion-retardant agent), was crushed to a size of approximately 1 cm. For further improving the rate of dissolution into the organic solvent, the crushed waste material was pulverized using a mesh mill manufactured by HORAI CO.LTD.

The pulverized waste styrene resin material, doped with the combustion-retardant agent, was dissolved, using a dissolution tank fitted with a stirrer and a temperature adjustment unit, manufactured by MITSUBISHI KAKOKI CO. LTD., so that the amount of the waste styrene resin material will be 20 wt % based on the weight d-limonene, to prepare a solution.

Regenerated styrene pellets were produced in the same way as in the Experimental Example 8 except not removing the combustion-retardant agent.

As a result, the amount of the residual solvent in the regenerated styrene pellets was not larger than 0.1 wt %, whilst the rate of decrease of the molecular weight of the styrene resin ascribable to decomposition product of the bromine-based combustion-retardant agent was approximately 20%. Also, impurities were yielded in an amount of approximately 2% in the styrene resin, whilst the glass transition temperature, that is thermal resistance, was lowered by 10° C., with the impact strength being decreased by approximately 30%. It may be seen from this that the combustion-retardant agent needs to be removed if the expanded styrene doped with a combustion-retardant agent is to be recycled as the characteristics of the regenerated styrene pellets are maintained.

Although the present invention has been explained with reference to several experimental examples, the present invention is not limited to these examples and may be modified as appropriate without departing from the scope of the invention.

What is claimed is:

1. A method for recycling a waste styrene resin material comprising:

dissolving the waste styrene resin material in an organic solvent boiling at a temperature lower than 200° C. and having solubility not less than 15 wt % at room temperature to prepare a solution of the waste styrene resin material;

removing impurities from the solution of the waste styrene resin material;

adding an anti-oxidant having a low vapor pressure to the solution of the waste styrene resin material freed of the impurities; and vacuum heating the solution of the waste styrene resin material freed of the impurities to remove the volatile components and the organic solvent to reduce the amount of the residual solvent in the styrene resin to not larger than 0.4 wt % to recycle the resulting styrene resin as a regenerated styrene resin.

2. The recycling method for the waste styrene resin material according to claim 1, wherein the organic solvent is free of halogen.

3. The recycling method for the waste styrene resin material according to claim 1, where the anti-oxidant is a hindered phenolic anti-oxidant being added to the solution of the waste styrene resin material freed of the impurities in an amount of 0.001 to 0.5 wt % based on the weight of the styrene resin material, the method further comprising:

vacuum heating the solution at a heating temperature lower than 260° C. for removing volatile components.

4. The recycling method for the waste styrene resin material according to claim 3 wherein, the hindered phenolic anti-oxidant has a vapor pressure at 20° C. not larger than $10^{-7}$ Pa.

5. The recycling method for the waste styrene resin material according to claim 1, wherein the organic solvent contains not less than 95 vol% of d-limonene.

6. The recycling method for the waste styrene resin material according to claim 1, wherein the waste styrene resin material is a waste expanded styrene resin material.

7. The recycling method for the waste styrene resin material according to claim 1, wherein the waste styrene resin material is high-impact waste styrene resin.

8. A method for recycling a waste styrene resin material doped with a combustion- retardant agent comprising:

dissolving the waste styrene resin material doped with the combustion-retardant agent in an organic solvent boiling at a temperature lower than 200° C. and having solubility not less than 15 wt % at room temperature to prepare a solution of the waste styrene resin material;

removing the combustion-retardant agent from the solution of the waste styrene resin material to set an amount of the residual combustion-retardant agent in the styrene resin to not larger than 1%;

adding an anti-oxidant having a low vapor pressure to the solution of the waste styrene resin material freed of the combustion-retardant agent; and vacuum heating the solution of the waste styrene resin material freed of the combustion-retardant agent to remove volatile components and the organic solvent to reduce the amount of the residual solvent in the styrene resin to not larger than 0.4 wt % to recycle the resulting styrene resin as a regenerated styrene resin.

9. The recycling method for the waste styrene resin material according to claim 8, wherein the organic solvent is free of halogen.

10. The recycling method for the waste styrene resin material according to claim 8, wherein a lower alcohol is added to the solution of the waste styrene resin material to precipitate the styrene resin to set the amount of the residual combustion-retardant agent to not larger than 1%.

11. The recycling method for the waste styrene resin material according to claim 10, wherein the lower alcohol has a boiling point lower than 200° C.

12. The recycling method for the waste styrene resin material according to claim 8, wherein a non-soluble component of the combustion-retardant agent is removed by decantation.

13. The recycling method for the waste styrene resin material according to claim 12, wherein a lower alcohol is mixed into the solution of the waste styrene resin material, freed of the non-soluble component of the combustion-retardant agent by decantation, to precipitate the styrene resin to set the amount of the residual combustion-retardant agent to not larger than 1%.

14. The recycling method for the waste styrene resin material according to claim 8, wherein the non-soluble component of the combustion-retardant agent is removed by a centrifuging machine.

15. The recycling method for the waste styrene resin material according to claim 14, wherein a lower alcohol is mixed into the solution of the waste styrene resin material, freed of the non-soluble component of the combustion-retardant agent by the centrifuging machine, to precipitate the styrene resin to set the amount of the residual combustion-retardant agent to not larger than 1%.

16. The recycling method for the waste styrene resin material according to claim 8, wherein the vacuum heating for removing volatile components is carried out at a temperature lower than 260° C.

* * * * *